(12) United States Patent
Smith et al.

(10) Patent No.: US 8,099,483 B2
(45) Date of Patent: Jan. 17, 2012

(54) DYNAMIC SOURCE SELECTION WITHIN AN IP MULTICAST NETWORK

(75) Inventors: Donald M. Smith, San Ramon, CA (US); Kuo-Hui Liu, San Ramon, CA (US); Chin Yuan, San Ramon, CA (US); Michael P. Sinwald, Tracy, CA (US)

(73) Assignee: AT&T Intellectual Property I, L.P, Atlanta, GA (US)

( * ) Notice: Subject to any disclaimer, the term of this patent is extended or adjusted under 35 U.S.C. 154(b) by 1336 days.

(21) Appl. No.: 11/216,319

(22) Filed: Aug. 30, 2005

(65) Prior Publication Data
US 2007/0058627 A1 Mar. 15, 2007

(51) Int. Cl.
G06F 15/173 (2006.01)
G06F 15/16 (2006.01)
G06F 15/177 (2006.01)
H04L 12/56 (2006.01)
H04L 12/28 (2006.01)

(52) U.S. Cl. ........ 709/223; 709/204; 709/205; 709/220; 709/224; 709/226; 370/390; 370/351; 370/401

(58) Field of Classification Search .................. 709/204, 709/205, 220, 223, 224, 226, 230; 370/390, 370/351, 401
See application file for complete search history.

(56) References Cited

U.S. PATENT DOCUMENTS

| | | | |
|---|---|---|---|
| 6,216,167 B1 * | 4/2001 | Momirov | 709/238 |
| 6,331,983 B1 | 12/2001 | Haggerty et al. | |
| 6,594,703 B1 | 7/2003 | Yunzhou | |
| 6,789,118 B1 | 9/2004 | Rao | |
| 6,947,434 B2 * | 9/2005 | Hundscheidt et al. | 370/401 |
| 6,999,465 B2 * | 2/2006 | McDonald et al. | 370/432 |
| 2002/0150094 A1 | 10/2002 | Cheng et al. | |
| 2003/0067924 A1 | 4/2003 | Choe et al. | |
| 2004/0205215 A1 * | 10/2004 | Kouvelas et al. | 709/231 |
| 2005/0058151 A1 * | 3/2005 | Yeh | 370/445 |

(Continued)

FOREIGN PATENT DOCUMENTS
JP 2003032299 1/2003

OTHER PUBLICATIONS

"An Overview of Source-Specific Multicast (SSM), Request for Comments: 3569", available at http://www.rfc-editor.org, 1 pg.

(Continued)

*Primary Examiner* — Ranodhi Serrao
*Assistant Examiner* — Farrukh Hussain
(74) *Attorney, Agent, or Firm* — Guntin Meles & Gust, PLC; Ed Guntin

(57) ABSTRACT

A method to perform dynamic source selection within an IP multicast network is performed at a designated router of an IP multicast network. At the designated router within the IP multicast network, a first source of a multicast group is selected to be forwarded to a receiving host or multiple receiving hosts. The first source is monitored to automatically detect when the first source exhibits a predetermined characteristic. At the designated router, responsive to the detection that the first source exhibits the predetermined characteristic, a second source of the multicast group is automatically selected to be forwarded to the receiving host or hosts. The method also supports automatic selection of all normally operating sources and forwarding of the traffic of such sources or channels to the receiving hosts or hosts.

14 Claims, 7 Drawing Sheets

U.S. PATENT DOCUMENTS

2005/0108425 A1    5/2005  Rabinovitch
2006/0209826 A1*   9/2006  Kawamura .................... 370/390
2006/0221958 A1*  10/2006  Wijnands et al. ............. 370/389
2007/0036143 A1*   2/2007  Alt et al. ....................... 370/352

OTHER PUBLICATIONS

"Configuring Pim Source Specific Multicast", *IP Multicast, in Ipriori Software Configuration Guide, III*, 9 pgs.

"Internet Group Management Protocol v. 3", available at http://www.rfc-editor.org, 50 pgs.

"PIM SM revised", 140 pgs.

"Protocol Independent Multicast—Sparse Mode (PIM-SM)", available at http://www.rfc-editor.org, 62 pgs.

"Source Specific Multicast for IP", available at http://www.rfc-editor.org, 16 pgs.

"Using IGMPv3 and MLDv2 For Source-Specific Multicast", available at http://www.rfc-editor.org, draft-holbrook-idmr-igmpv3-ssm-08.txt, 11 pgs.

"v2 Internet Group Management Protocol", available at http://www.rfc-editor.org, 23 pgs.

CISCO, "Source Specific Multicast Mapping", http://www.cisco.com/en/US/products/sw/iosswrel/ps5207/products_feature_guide09186a00801a6d6f.html, 35 pgs.

* cited by examiner

US 8,099,483 B2

DYNAMIC SOURCE SELECTION WITHIN AN IP MULTICAST NETWORK

TECHNICAL FIELD

The present application relates generally to the field of data networking and, in one example, to source selection in an Internet Protocol (IP) multicast network.

BACKGROUND

Internet Protocol (IP) multicast typically refers to one or more protocols for effectively sending data communications to multiple receivers at the same time on a TCP/IP network, utilizing a multicast address. Example protocols that support IP multicast include Protocol Independent Multicast (PIM), Distance Vector Multicast Routing Protocol (DVMRP), Multicast OSPF (MOSPF), Multicast BGP (MBGP), and the Internet Group Management Protocol (IGMP).

In an IP multicast network with routers between multicast sources and receiving hosts, multicast traffic may be transmitted through the network to a designated router (DR) of a receiving host. The designated router may be the last hop router in a path (e.g., specified in terms of a multicast distribution tree) to a receiving host. For example, a receiving host may execute IGMP v2 to inform the designated router of its interest in receiving a particular multicast group. Multicasting of television channels provides one example of an application that utilizes IP multicast technology. In this example, a television channel may be represented by a multicast group (e.g., a multicast group address G is used to identify the television channel (e.g. ABC channel 1) to the multicast network).

Continuing the above example, it is the responsibility of the designated router to read an IGMP v2 message (which contains the multicast group G) received from a receiving host, and to send a PIM message towards the source of the relevant multicast group (G). As the PIM message flows through the multicast network, a multicast path is built for the relevant multicast group. In this manner, a multicast tree is established between a source router and a designated router within the multicast network. When a source host sends a multicast stream, the stream accordingly flows down the tree to the designated router. With respect to the above mentioned PIM protocol, a particular implementation thereof is known as Source Specific Multicast (SSM). In the case of PIM-SSM, the above mentioned PIM message contains the IP address of both the source (S) and the group (G). The combination (S,G) is referred to as a "multicast channel".

Of course, the source of a multicast group may fail, or network problems may cause a multicast stream to fail. The continued delivery of IP multicast traffic in such a situation presents a number of technical challenges.

SUMMARY

According to one aspect, there is provided a method to perform dynamic source selection within an IP multicast network. At a router within the IP multicast network, a first source of a multicast group is selected to be forwarded to a receiving host. The first source is monitored to automatically detect when the first source exhibits a predetermined characteristic. At the router, responsive to the detection that the first source exhibits the predetermined characteristic, a second source of the multicast group is automatically selected to be forwarded to the receiving host.

BRIEF DESCRIPTION OF THE DRAWINGS

Example embodiments of the present invention are illustrated by way of example and not limitation in the figures of the accompanying drawings, in which like references indicate similar elements and in which.

DETAILED DESCRIPTION

In the following Detailed Description, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

In the below described exemplary embodiment, a dynamic source selection system and methodology are described whereby a designated router (DR) (e.g., a PIM-SSM designated router, or a PIM-SM designated router which is configured to switch from a shared tree to a shortest path tree) monitors certain characteristics of a first source (e.g., a received multicast channel) and subsequently selects which channel (or channels) are forwarded to the receiving systems, based on the monitored states of such sources.

Figure 1:
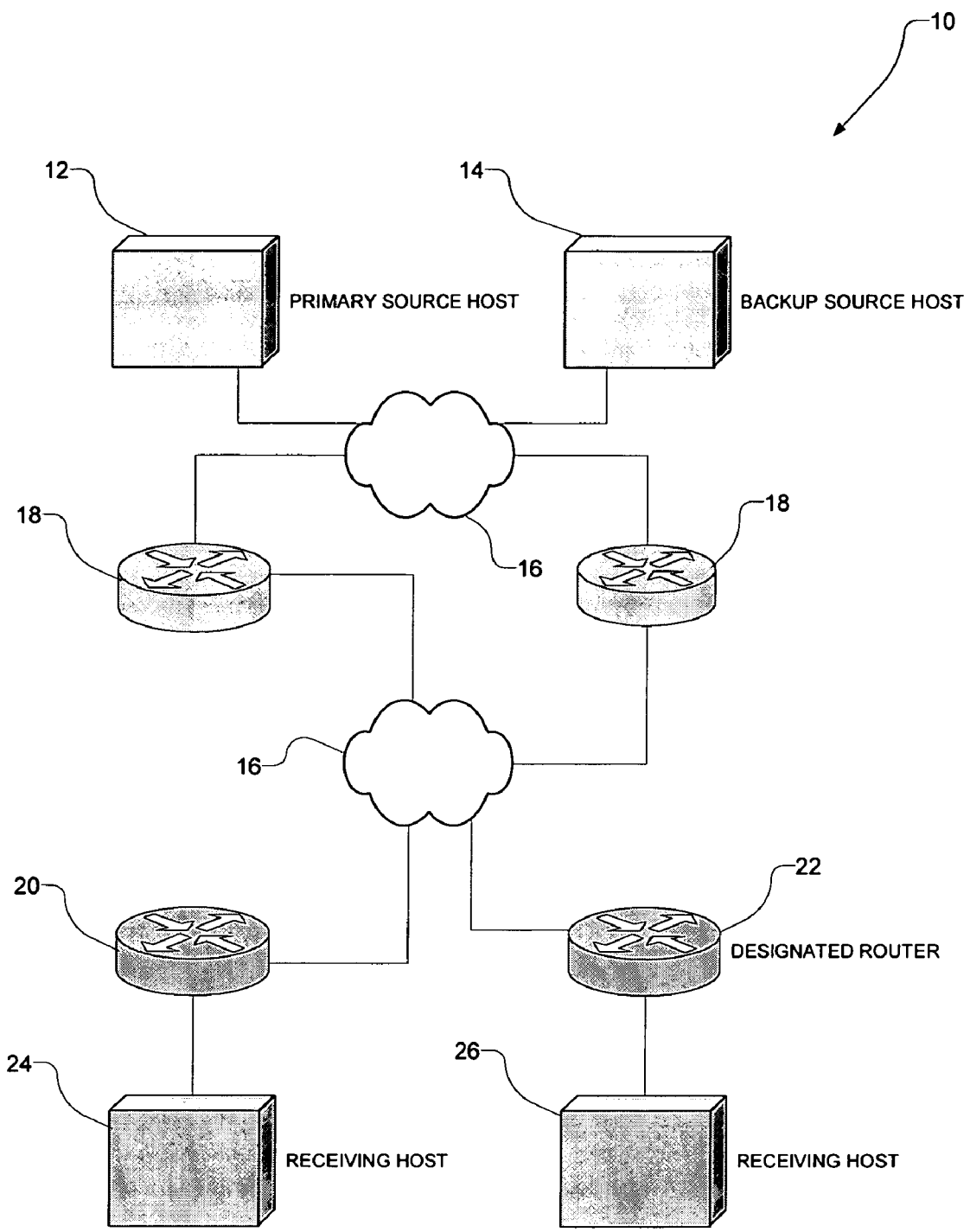
FIG. 1 is a diagrammatic representation of an IP multicast network 10 within which an example embodiment of the present invention may be deployed.

FIG. 1 is a diagrammatic representation of an IP multicast network 10 within which an example embodiment of the present invention may be deployed. The IP multicast network 10 is shown to include multiple source hosts, including a primary source host 12 and a backup source host 14. In one embodiment, the primary and backup source hosts 12 and 14 may each be configured to multicast overlapping (or identical) data (e.g., content in the form of television programming).

The source hosts 12 and 14 may operationally multicast data via one or more networks 16, coupled by routers 18, to multiple designated routers, such as designated routers 20 and 22. In one embodiment, each of the designated routers constitutes a multicast last hop router associated with a respective receiving host 24 or 26. Specifically, the designated router 22 constitutes a multicast last hop router with respect to the receiving host 26, and implements a protocol that utilizes channel-specific messages to join and leave multicast groups.

Multicast-capable routers typically operate to create distribution trees, which control the path IP multicast traffic takes through the network to deliver traffic to all receivers. Two basic types of multicast distribution trees are (1) source trees, and (2) shared trees. Turning first to source trees, a source tree has a source as its root, with multiple branches forming a spanning tree through a network (e.g., network 16 and the designated routers 20 and 22) to multiple receiving hosts. Because such a source tree utilizes the shortest path through a network, it may also be referred to as a Shortest Path Tree (SPT). Shared trees, on the other hand, use a single common root placed at some chosen point within the network, this shared root being referred to as a Rendezvous Point (RP). Exemplary embodiments of the present invention are herein described with reference to a PIM-SSM designated router that operates utilizing source trees, or a PIM-SM designated router that is configured to switch from a shared tree to a source tree.

With respect to source trees, a special notation of "S,G" enumerates a shortest path tree (SPT) in which S is the IP address of the source, and G is the multicast group address. The (S,G) notation implies that a separate SPT exists for each individual source sending to each group.

In one example embodiment, the designated router 22, shown in FIG. 1, may be a PIM-SSM router, which implements only the SSM (Source Specific Multicast) subset of PIM-SM as specified in draft-ietf-pim-sm-v2-new-11.txt, "Protocol Independent Multicast-Sparse Mode (PIM-SM): Protocol Specification (Revised)". In this context, references to PIM-SSM join and prune messages refer to implementations of PIM-SSM, or to implementations of PIM-SM in the phase in which PIM-SM has made a decision to switch from a shared tree to a source tree. In either case, the messages are source specific (e.g., designated (S,G)). However, it should be appreciated that the present invention is not limited to systems employing the above mentioned protocols, and example embodiments may be applied to any multicast last hop router which implements a protocol that utilizes channel-specific messages to join and leave multicast groups.

Referring again to FIG. 1, the primary source host 12, as a source of a multicast group, may fail, or network problems may cause the multicast stream originating from the primary source host 12 to fail. In such situations, the supply of the multicast stream can be restored from another source host, in the exemplary form of the backup source host 14. An example embodiment seeks to provide a system and methodology whereby such a backup source host 14 can be automatically identified, and the supply of a multicast stream can be automatically switched to such a backup source host 14, when necessary. In one embodiment, it is desirable to accomplish to this without having to involve a receiving host (e.g., the receiving host 26) in the switchover process. This desirability increases when a large number of source hosts serve a large number of receiving hosts.

Referring again to FIG. 1, simply configuring the designated router 22 to accept traffic from multiple sources for a given group may result in undesirable behavior for certain applications, such as video multicasting. For example, when two sources are sending traffic to a particular group, the result is that the designated router 22 would, in this case, forward the streams from both sources to a receiving host 26. This not only doubles the bandwidth to the receiving host 26, but the receiving host may not be able to correctly process the traffic if it contains multiple streams for a single video channel. If a designated router 22 is configured with a single source for a particular group, one option is to manually reconfigure the designated router 22 to use a backup source if a primary source has failed.

An example embodiment is described below of a method and mechanism whereby a designated router 22 can be configured with multiple sources for a single multicast group. In one explicit mode of operation, the designated router 22 is instructed to treat a list of sources (e.g., source hosts) as a prioritized list so that at any one time, a particular source is regarded as a primary source and other sources are considered backups. In the example embodiment, the designated router 22 monitors the state of a received multicast channel (or multicast channels) from these multiple sources. If the designated router 22 detects that a primary source has failed, it automatically switches to a backup source, provided the designated router 22 has determined that a normally operating backup source is available. In an example embodiment, a receiving host 26 is not involved in the switchover process.

In a dynamic mode of operation, the designated router 22 may be instructed to apply logic or rules (as opposed to a prioritized list) in the selection of a backup source, in the event that a primary source is deemed to have failed.

In yet a further mode of operation, a designated router 22 may be instructed to monitor the state of a received multicast channel (or channels), and forward all normally operating channels to the receiving host 26.

Prior to describing the architecture and methodology of an example embodiment in further detail, it is useful to define certain notations in terms of which the example embodiment will be described. With respect to example sources, groups and channels, a multicast source address may be represented by $S(i)$, and a multicast group may be represented by $G(j)$. As noted above, in the example embodiment, a multicast group may have one or more associated sources, and one source may be associated with multiple groups. The combination of the source $S(i)$ and a group $G(j)$ generated by that source may be labeled as a multicast channel $C(i,j)$. Accordingly:

$$C(i,j)=S(i),G(j).$$

Figure 2:
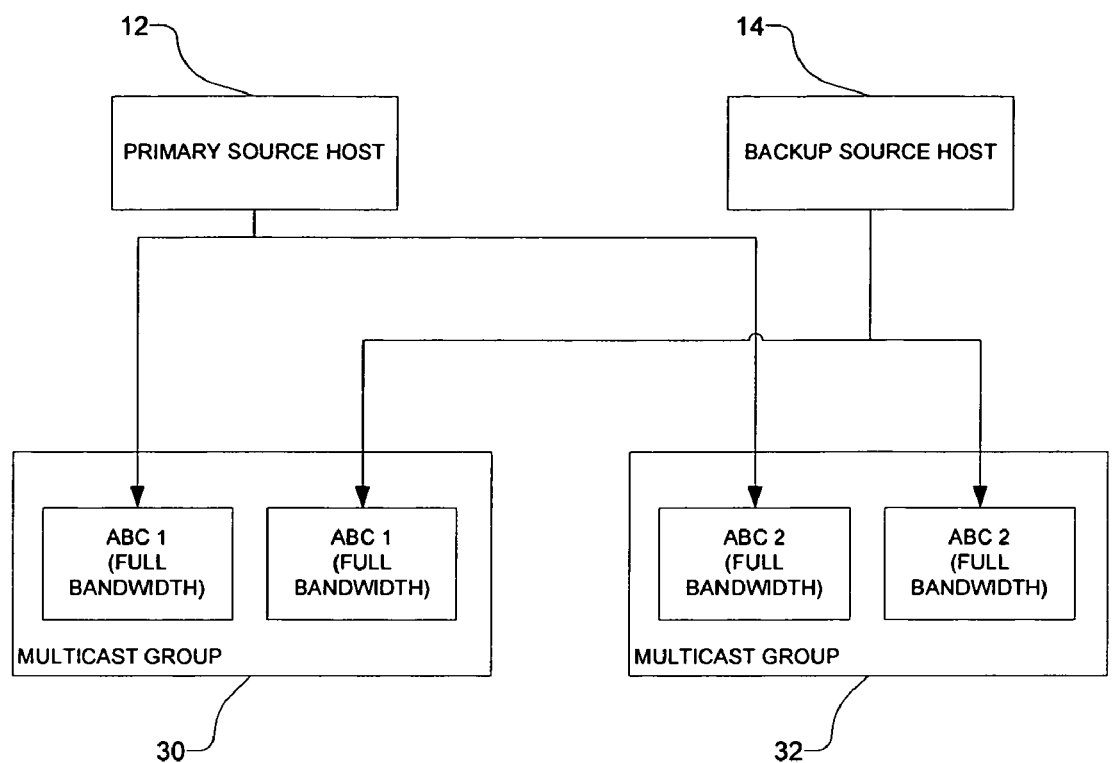
FIG. 2 is a block diagram illustrating how multiple sources are each associated with multiple groups, according to an example embodiment of the present invention.

FIG. 2 is a block diagram illustrating how multiple sources (e.g., primary source host 12 and backup source host 14) are each associated with multiple groups, in the example form of multicast groups 30 and 32. Similarly, FIG. 2 illustrates each of the multicast groups 30 and 32 may have more than one associated source. In the example setup shown in FIG. 2, each of the primary and backup source hosts 12 and 14 acts as a source host for two sources, each represented by a distinct source address, in the exemplary form of ABC 1 and ABC 2.

For the sake of convenience, a multicast group address may herein simply be referred to as a "group", and a source address may simply be referred to as a "source". Nonetheless, for the purposes of this application, it is not intended that the terms "group" and "source" be limited to addresses. Similarly, a PIM designated router may below be referenced as a designated router, or simply as a "DR". However, it is not the intention that the term "designated router" be so limited. Also, the terms "joined" and "prune" are not intended to be limited to standard PIM-SSM join and prune messages, although such messages do provide examples of manners in which join and prune operations may be implemented in an example embodiment.

More specifically, in the example embodiment described below, the transmission of a PIM-SSM joined message toward the source of a multicast group provides an example of a "join". The optional pre-joining and monitoring of a channel is supported, in order to reduce failover time. This option may be appropriate when a multicast network is able to handle the additional traffic when pre-joined channels have active sources. Pre-joined channels may operate on a per-channel basis, so as to enable the selective application thereof only to high priority channels.

The example embodiment described below also supports a configuration operation (e.g., with respect to a configurable parameter), which controls whether or not a channel is pruned after it fails. In the example embodiment, the transmission of a PIM-SSM prune message toward the source of a multicast group provides an example of a "prune". Pruning may operate to reduce the amount of state information to be stored in PIM routers. However, in certain scenarios, not pruning may also provide certain advantages if it is expected that a channel will be restored in a reasonable amount of time, and would subsequently be needed as a primary or backup channel.

The example embodiment may also provide the option to monitor non-joined channels. This option may reduce failover time when a designated router is on a particular Local Area Network (LAN), and another router on the same LAN is receiving (or is expecting to receive) a channel of interest. In a failover situation, a channel of interest that is being received at the request of the other router can be quickly selected, since it is already being monitored and its channel state is known. The newly selected channel would subsequently be joined. Joining the previously non-joined channel ensures that a multicast stream will continue to flow to the relevant LAN, even if another router on the LAN prunes the channel. This feature requires that the designated router 22 accept traffic of a channel that it has not joined, for the purpose of applying functions to be described in further detail below.

Further, an example embodiment may support an "any source" option. The example "any source" option represents one or more non-configured sources that may exist for a group. The exemplary embodiment includes monitoring, at a designated router 22, all channels received for a particular group, and building a local list of corresponding sources at the relevant designated router 22. This feature may provide certain advantages in cases where there is no a priori knowledge of all sources of a particular group, or it is desired to have sources discovered automatically, at which time they would become available for selection as a primary source, or for designation as backups, assuming they are operating normally.

Further, in one example embodiment, a list of sources (e.g., with the any source option) may be defined for each group. Different types of rules can be defined to control selection of a channel from a list of sources. A select-one rule, to be described in further detail below, results in the selection of one and only one channel for a given group. A "select-all" rule, also to be described in further detail below, results in a selection of all channels that are operating normally, for a given group. In yet a further embodiment, more complex rules (e.g. logic rules involving AND, OR, XOR grouping operations) may be utilized.

Further, when a channel is selected in accordance with one or more rules, traffic associated with that rule is forwarded from the designated router 22 to one or more receiving hosts 26 according to standard PIM-SSM forwarding specifications, in the example embodiment.

In yet a further example embodiment, the concept of "bundling" involves treating a particular set of groups as a single entity for the purposes of selection and failover. The various types of rules that are described herein are, in this example embodiment, also applicable to bundles.

Figure 3:
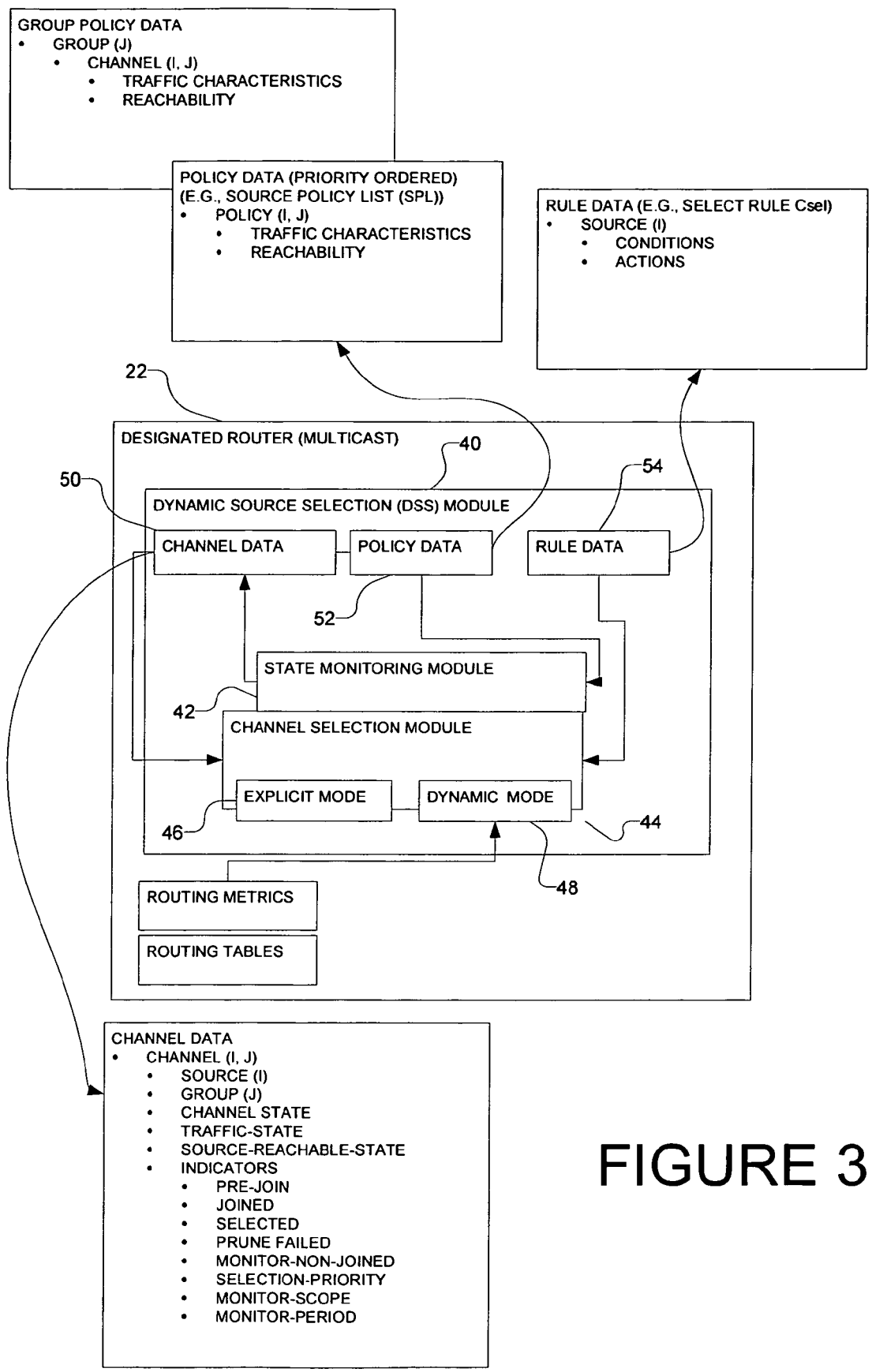
FIG. 3 is a block diagram illustrating architectural details for a dynamic source selection module, according to an example embodiment of the present invention, and associated data structures.

FIG. 3 is a block diagram illustrating architectural details for a dynamic source selection (DSS) module 40, and associated data structures, according to an example embodiment of the present invention. In the example embodiment, the dynamic source selection (DSS) module 40 is hosted on a designated router 22, and operates to perform a number of the operations described herein. The DSS module 40 is shown to include a state monitoring module 42 that is responsible for monitoring one or more predetermined characteristics of sources, the sources in the example embodiment constituting channels as described above. The DSS module 40 further includes a channel selection module 44 that is responsible for the selection of source of a multicast group from which data (e.g., IP multicast stream) is to be forwarded to a receiving host 26. The channel selection module 44 may furthermore operate in an explicit mode 46 or a dynamic mode 48, to be described in further detail below.

The state monitoring module 42 and the channel selection module 44 performed their respective functions with respect to a number of data types. At a high level, the state monitoring module 42 has access to channel data 50, which may include configuration and indicator data, and policy data 52, which may include information that allows the state monitoring module 42 to detect when a particular channel is exhibiting a characteristic that may be indicative of a failure of the relevant channel.

The channel selection module 54 has access to both the channel data 50, and further rule data 54, the rule data 54 specifying the rules in terms of which selection of a primary channel (and possibly also a number of backup channels) is performed.

Turning now more specifically to the channel, policy and rule data 50, 52 and 54, each channel monitored by the state monitoring module 42 may be included in a list of channels included within the channel data 50, the channel data 50 providing information regarding the state and configuration of each such channel. As shown in FIG. 3, each channel C(i,j) may be uniquely identify by a source S(i) and a group G(j).

The channel data 50 may also include traffic-state data, determined in terms of monitored characteristics specified by a policy associated with the relevant channel. In a further embodiment, the traffic-state may be dynamically determined by the state monitoring module 42, in which case this information would not necessarily be stored as channel data 50. Further details regarding monitored characteristics and policies are provided below.

Each channel, identified in the channel data 50, further has an associated policy, which may be defined by the policy data 52. In the example embodiment, the policy data 50 may be embodied as a Source Policy List (SPL), which refers to traffic characteristics of monitored channels, or the reachability of the sources of monitored channels. The reachability of the monitored channels may be determinable from unicast routing information available to the designated router 22. Further, the policy data may refer to both traffic characteristics and source reachability.

A policy, with respect to a monitored channel, specifies values of monitored characteristics which are associated with possible states of the monitored channel. Optionally, a policy for a monitored channel may also include timers and other indicators to control the state monitoring and channel selection operations performed by the modules 42 and 44. Policies may furthermore be customizable according to the types of streams, and the requirements of receiving applications hosted via receiving hosts 26.

Examples of traffic characteristics that may be referenced by a policy include various bandwidth, sample frequency, sample duration parameters, and the values of parameters that are used to determine channel traffic-states.

Figure 4:
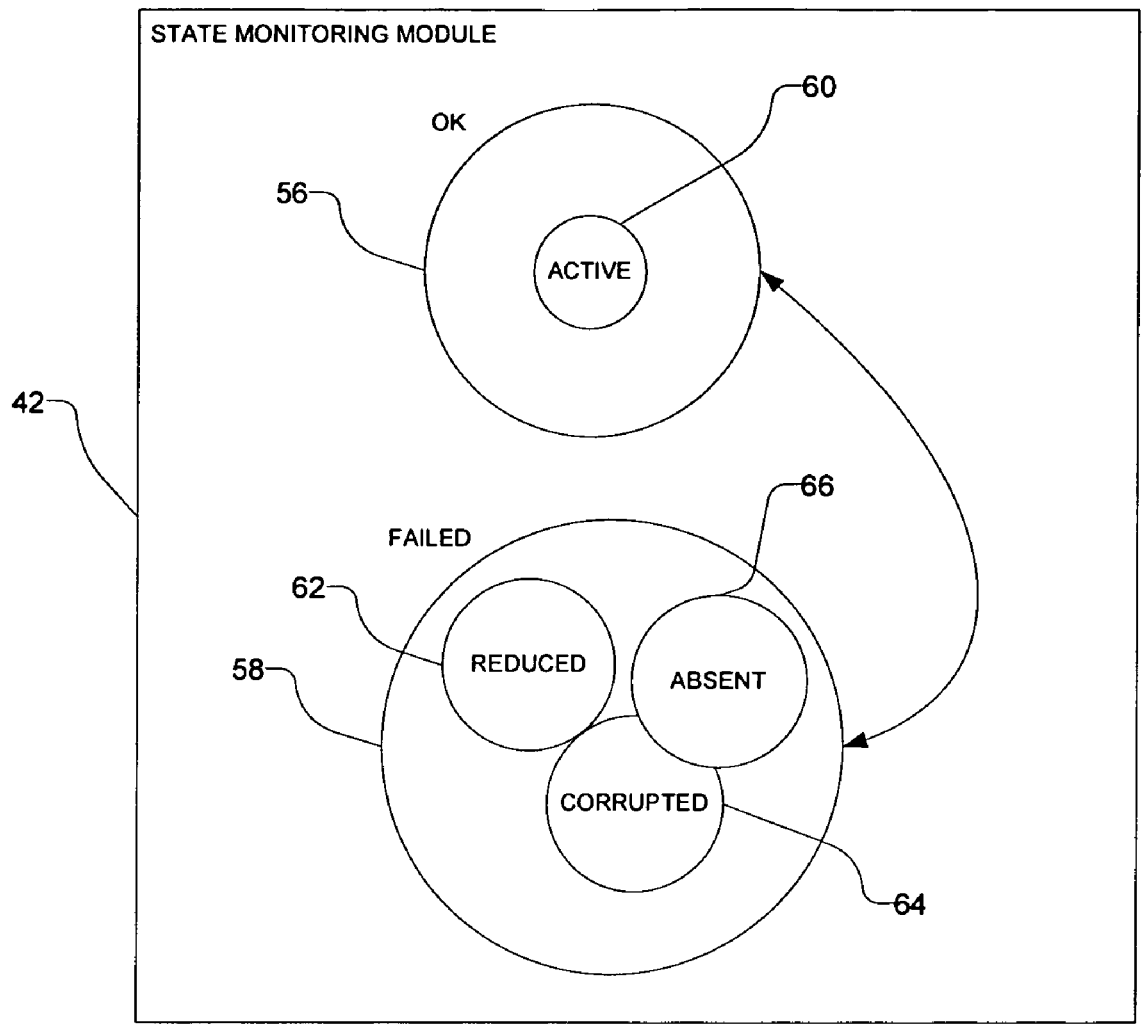
FIG. 4 is a staged diagram showing a number of traffic states that may be recognized by the state monitoring module, according to an example embodiment of the present invention.

Example traffic-states are now discussed with reference to FIG. 4. Specifically, FIG. 4 is a diagrammatic representation of states that may be recognized by the state monitoring module 42, according to an example embodiment of the present invention. At a high level, although various embodiments may implement many traffic-state values, only two may be required for source selection. Specifically, a traffic-state OK 56 indicates that a channel is operating normally, according to the traffic policy and a traffic-state FAILED 58 means that the channel is not operating normally, according to a traffic policy. Traffic-states may, in a further embodiment, be defined with higher resolution to include an active state 60, a reduced state 62, a corrupted state 64 and an absent state 66, which are shown in FIG. 4 to constitute sub-states of the OK and FAILED states 56 and 58.

As also noted above, a policy for a monitored channel may include source reachability. In this case, source-reachable-state information may be maintained as part of the channel data 50, and have values of REACHABLE/NOT-REACHABLE. The channel selection module 44, in the exemplary embodiment, may also refer to a channel-state indication stored as part of the channel data 50. If a policy contains a traffic characteristics component and a source reachability component, then the channel-state is OK, only if the traffic-state is OK, and the source-reachable-state is REACHABLE. Otherwise, the channel-state is FAILED. If a policy for a monitored channel contains only a traffic characteristics component, then the channel-state is OK only if the traffic-state is OK. Otherwise, the channel-state is FAILED. In a further embodiment, if a policy contains only a source reachability component, then the channel-state is OK only if the source-reachable-state is REACHABLE. Otherwise, the channel-state is FAILED. A policy P(i,j) may include a set of policies that are applied to channel C(i,j).

In addition to the above discussed channel-state, traffic-state, and source-reachable-state information, the channel data 50 may also include a number of indicators. A joined-indicator has two possible values, namely JOINED value and a NOT-JOINED value. The JOINED value indicates that a PIM-SSM join for the channel has been sent, and PIM-SSM state is maintained. A NOT-JOINED value indicates that the designated router 22 has not sent a PIM-SSM join for the channel, or that if a previous join may have been sent, it was followed by a prune.

A selected-indicator may also be associated with a channel, and has two possible values, namely a SELECTED value and a NOT-SELECTED value. The SELECTED value indicates that the channel has been selected according to a select rule and policies. A NOT-SELECTED value indicates that the channel is not currently selected.

The channel data 50 may also include a number of configurable indicators. Specifically a prune failed indicator is a configurable indicator associated with a channel. When the traffic-state of a joined channel changes from OK to FAILED, if prune-failed equals "y", and if the sources are reachable according to unicast routing information maintained by the designated router 22, then the channel is pruned. On the other hand, a prune-failed="n" is useful if it is anticipated that a FAILED channel will be restored to an OK traffic state in a reasonable amount of time, and if the additional PIM state information possible additional traffic (if traffic is still flowing in the channel) that results from not pruning is acceptable.

A pre-join indicator is again a configurable indicator associated with a channel. If pre-joined="y", then at start up of the DSS module 40, if the channel is not already joined, a join message is sent, provided the source is reachable according to unicast routing information maintained by the designated router 22, even if no hosts have requested the channel for the group. If pre-join="n", then such a join is not sent at start up of the DSS module 40.

If a pre-joined channel has prune-failed="n", then if the relevant channel that was initially selected subsequently fails, it remains joined and continues to be monitored, assuming its irrelevant source remains reachable.

A monitor-non-joined indicator is a configurable indicator, again associated with each monitored channel. If monitor-non-joined="n", then only channels that have been joined are monitored. If monitor-non-joined="y", then a channel is monitored even if it is not joined. This setting can, in one example embodiment, reduce failover time when the designated router 22 is on a LAN and another router on the LAN is receiving (or expected to receive) a channel. If a failover situation occurs, the channel could be quickly selected since it is already being monitored and its channel state is known. The relevant channel would subsequently be joined.

The channel data 50 may further include a selection-priority indicator, this indicator being a configurable indicator associated with a multicast group. The selection-priority indicator controls the priority for a selection of sources, when an example embodiment that utilizes a select-one rule is implemented. The selection-priority indicator may be utilized by the channel selection module 44 to determine whether it should operate in the explicit mode 46 or the dynamic mode 48. For example, when selection-priority=EXPLICIT, the order of the sources is as they appear in the channel data 50, or the ordering policies of the policy data 50 (e.g., in the source policy list) determines the priority in which channels are selected.

When selection-priority=DYNAMIC, selection priority is based on selection metrics for the sources in the channel and/or policy data 50 and 52. For example, for each source address S, a selection-metric may be composed of metric-preference, metric and S. Metric-preference is a value assigned to the unicast routing protocol that provided the route to Source, with lower values having higher preference. Metric-preference may also be referred to as "administrative distance." Metric is the unicast writing metric associated with the route to reach S. The priority of selection is the inverse of the selection-metric. That is, the source where the lower selection-metric has the highest priority for selection.

Monitor-scope is a configurable indicator, associated with a multicast group, which controls which channels are monitored when the select-one rule is used. When monitor-scope is set to "ALL", all channels of a particular group with joined-indicator value of JOINED and all channels with monitor-non-joined of "Y" are continuously monitored. Note that when S(*) is included in the SPL, all received channels for the group are monitored. It is recommended that when monitor-scope is set to "ALL", then all the channels for that group should have prune-failed="N", since the intent is to continue to monitor the channels, and it is simpler to monitor a channel that remains joined. When monitor-scope is set to "ONE", then at most one channel is monitored at a time. It is recommended that monitor-scope be set to "ONE" only when at most one channel has channel pre-join set to "y" and only when S(*) is not included in the SPL for the group.

Monitor-period is a configurable parameter associated with a multicast group. This is the interval between the times when DSS module 40 checks for the reception of an IP packet for the purposes of monitoring a channel. For example, if the monitor-period is set to 100 msec, then for each channel associated with the group, the DSS module 40 checks for reception of a packet for that channel every 100 msec.

In one example embodiment, the channel data 50 and the policy data 52 may include a Source Policy List (SPL), which is a list of sources and associated policies configured for a particular group G(i):

For G(i): $SPL(i)=[(S(1),P(1,i)),(S(2),P(2,i)),\ldots(S(j),P(j,i)),\ldots(S(j\max),P(j\max,i)),(S(*),P(*,i))]$ The sources S(j) are referred to as the configured sources. S(*),P(*,i) may be optional. S(*) represents a source or sources that may exist for G(i), but which are not in the configured list in the SPL. S(*) has a single policy P(*,i). S(*) may be used in cases in which there is no a priori knowledge of all the sources for G(i), or if it is desired to have a source or sources discovered and added to the list automatically.

When S(*) is specified, a working SPL is maintained. The working SPL is initialized to the configured SPL, but without the S(*):

For G(i): initial working–$SPL(i)=[(S(1),P(1,i)),(S(2),P(2,i)),\ldots(S(j),P(j,i)),\ldots(S(j\max),P(j\max,i))]$ With S(*), monitoring may result in discovery of one or more non-configured sources for the group. These non-configured sources are added as they are discovered to the end of the working SPL, each with the policy P(*,i). A discovered source is added to the list only if its channel-state is OK.

As noted above, the DSS module 40 includes rule data 54. Specifically, for a particular G(i), an abstract select rule "R" is applied to the set of channels that are associated with that group. A group G(i), its list of sources and associated policies, and abstract select rule is, in one example embodiment, referred to as a channel select rule Csel(i):

$Csel(i)=G(i)|R[SPL(i)]$ in which the rule has operated on the SPL. The "|" simply indicates that R[SPL(i)] is associated with G(i)

For example, rule R might be specified to be "for a given G(i), select all channels which have channel-state OK. Another rule might be to select only a single channel with channel-state OK. Another might be to select at most only two channels, etc. More complex rules involving various AND, OR, XOR, and grouping operations are possible.

In some cases, there is a single policy per group, independent of the associated sources. Suppose that in this case P(i,j) is represented by P(i). In these cases, For G(i): $SPL(i)=P(i)|SL(i)$ Where SL(i) is just a list of sources for G(i):

For G(i): $SL(i)=[S(1),S(2),\ldots S(j),\ldots S(j\max),S(*)]$

In this case:

$Csel(i)=G(i)|P(i)|R[SL(i)]$

Figure 5:
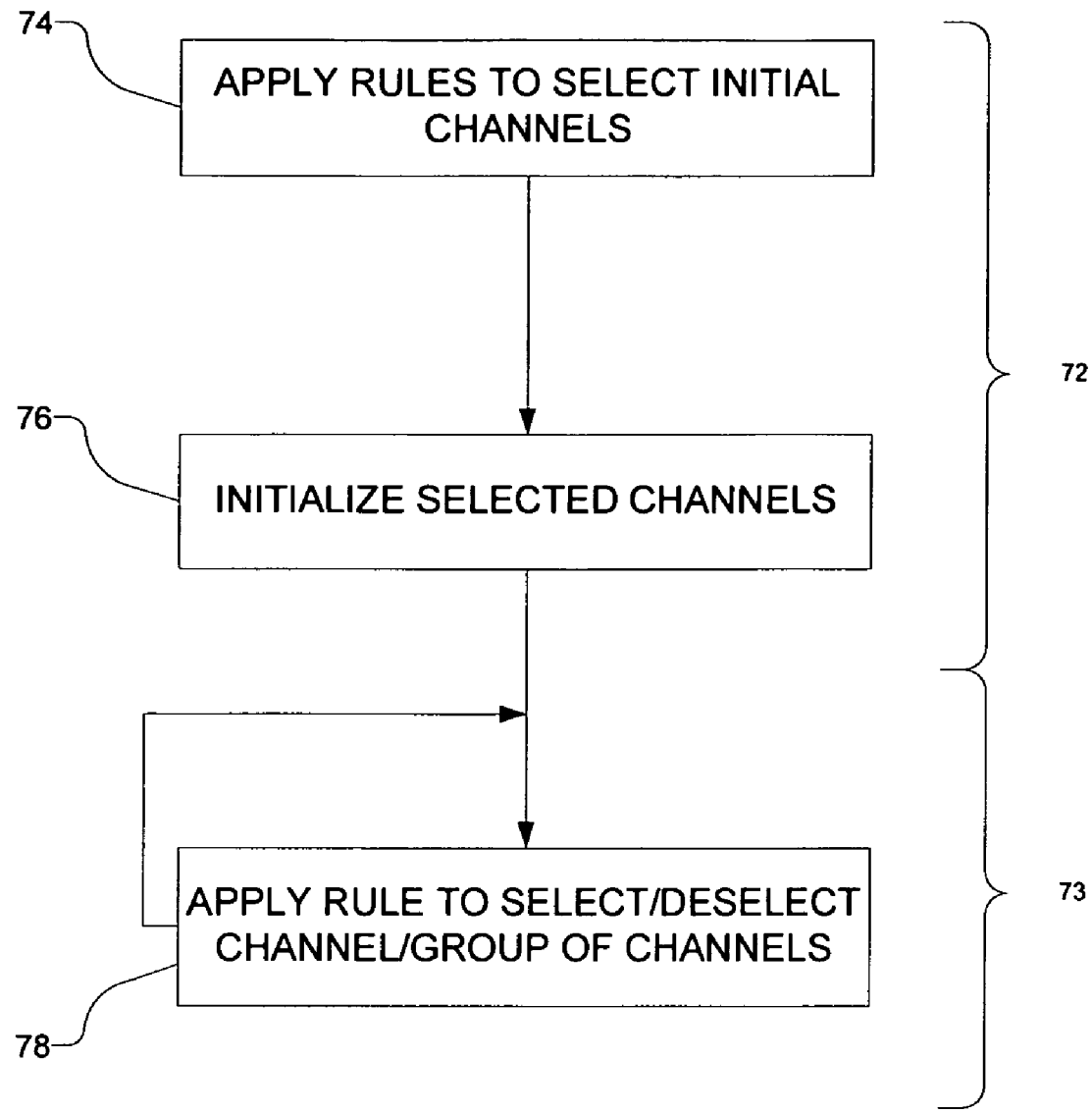
FIG. 5 is a flowchart illustrating a method, according to an example embodiment of the present invention, to perform dynamic source selection within an IP multicast network.

FIG. 5 is a flowchart illustrating a method 70, according to an example embodiment of the present invention, to perform dynamic source configuration and processing within an IP multicast network. The method 70 includes two distinct phases, namely a startup phase 72 and a processing phase 73.

Within the startup phase, at operation 74, rules (e.g., Csels) are applied and operate at a global level by a DSS module 40 of the designated router 22. In one embodiment, Csels are applied to and operate at the global level of the designated router 22, but subsequent monitoring and selection processing occur at the channel level. Subsequently, all channels explicitly identified in the Csels are monitored, except those which are not-joined and which have monitor-non-joined="n". A channel is monitored on the interface indicated by the RPF data for the source of the channel. If a Csel contains S(*), all interfaces must be monitored, since the sources are not known ahead of time. Which channels are monitored depends on the select rule, as described in the following sections. In all cases in which the source of a channel is known, a channel is monitored on the interface indicated by the RPF data for the source of the channel.

At operation 76, the selected channels are processed as follows:

For all configured channels, check the current joined state.
For all configured channels which are already joined (independent of the value of the pre-join indicator):
Set joined-indicator to JOINED.
Set selected-indicator to selected.
Set traffic-state to OK.
If traffic for the channel(s) is being forwarded, continue to forward the traffic. The intent is that channels that are already joined prior to configuring of the DSS module 40 will continue to be joined and selected, at least initially.
For all configured channels which are not already joined and have pre-join="n":
Set joined-indicator to NOT-JOINED.
Set selected-indicator to not-selected.
Set traffic-state to failed.
For all configured channels which are not already joined and have pre-join="y":
Join the channel, provided the source is reachable according to the unicast routing information. Note that reachable in this context in the determined by the unicast routing, whether or not source-reachable components are in the policy.
Set joined-indicator to JOINED.
Set selected-indicator to not-selected.
Set traffic-state to failed.
For all configured channels:
Initialize traffic related policy parameters Following initialization of the selected channels, at operation 76, the DSS module 40 proceeds to apply the rule data 54 to select and deselect channels (or groups of channels) in accordance with the rules. As noted above, in various embodiments, different types of rules may be applied. For example, the rule data 54 may specify that a select-one rule or a select-all rule be applied at operation 78. Details regarding the application of each of these rule types are discussed in detail below.

The below discussion also discusses the concept of "bundle groups", and how rules may be applied in the treatment of a particular set of groups as a single entity for the purposes of selection at operation 78.

Figure 6:
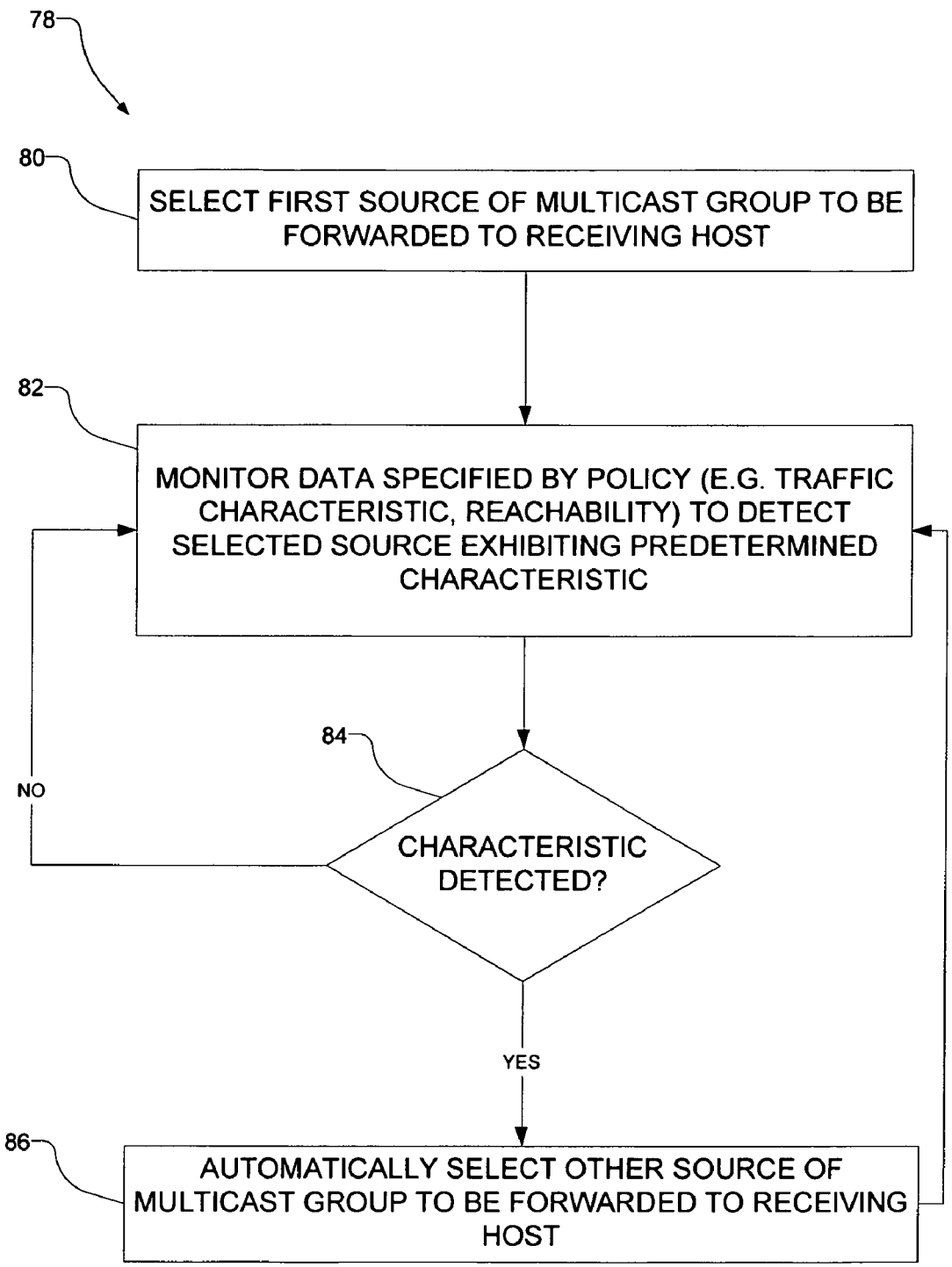
FIG. 6 is a flowchart indicating, at a high level, operations that may be performed as a part of the selection/deselection operation, as described with reference to FIG. 5.

FIG. 6 is a flowchart indicating, at a high level, operations that may be performed as a part of the selection/deselection operation 78, as described with reference to FIG. 5. Further specific example implementations are discussed subsequent to the discussion with reference to FIG. 6.

At operation 80, the channel selection module 44 selects a first source (e.g., a first channel) of a multicast group to be forwarded to a receiving host 26.

At operation 82, the state monitoring module 42 monitors data specified by a policy (e.g., traffic characteristic and reachability data) to detect whether one or more sources selected at operation 80 are exhibiting predetermined characteristics. For example, traffic characteristic information or reachability information may indicate that a selected source has failed, or has entered one of the FAILED states 58 as described above with reference to FIG. 4.

At decision block 84, a determination is made as to whether a predetermined characteristic (e.g., a FAILED state) has been detected. If not, the state monitoring module 42 proceeds to monitor data specified by a relevant policy.

On the other hand, should a predetermined characteristic be detected with respect to one or more sources, the method proceeds to operation 86. At operation 86, the channel selection module 44 proceeds to automatically select a further source of the multicast group to be forwarded from the designated router 22 to the receiving host 26.

A description of the various types of rules that may be applied in various example embodiments is not provided.

1. Select-One Rule

Select-one is the rule which results in the selection of one and only one source for a given group. In this case, the Csel is written as $$Csel(i)=G(i)|\text{select-one}[SPL(i)]$$

1.1 Csel Processing

After initialization, monitoring, and setting channel-state according to the policies, the channel selection and deselection processes are performed, as described here, according to one embodiment of the present invention.

With the select-one rule, which channels are monitored depends on the monitor-scope and monitor-non-joined parameters, and on whether or not S(*) is included in the SPL. When monitor-scope is set to "all", all channels of the group with joined-indicator value of JOINED and all channels with monitor-non-joined of "y" are continuously monitored. Note that when S(*) is included in the SPL, all received channels for the group are monitored. When monitor-scope is set to "one", then at most one channel is monitored at a time. Monitor-scope may be set to "one" only when at most one channel has channel pre-join set to "y" and only when S(*) is not included in the SPL for the group.

In cases in which the source of a channel is known, a channel is monitored on the interface indicated by the RPF data for the source of the channel. When S(*) is configured, all received channels for the group are monitored, and monitoring must be done on all interfaces that could potentially receive these channels. This could result in monitoring the group on all the interfaces of the router.

With the select-one rule, only one channel is selected at a given time.

With S(*), monitoring may result in discovery of one or more non-configured sources for the group. If a discovered source has channel-state of ok, it is added to the end of the working SPL. Note that the priority for selection of a channel added this way is determined by the selection-priority configuration option, as described next.

A group level policy configuration option, selection-priority, determines the priority for selection of a source by the select-one rule. When selection-priority=EXPLICIT, the order of the sources as they appear in the working SPL determines the priority for selection, with the leftmost, S(1), being the highest priority. When selection-priority=DYNAMIC, the selection priority is determined by the selection-metric associated with each of the sources in the working SPL. For each source address S, selection-metric is composed of metric-preference, metric, and S. Metric-preference is a value assigned to the unicast routing protocol that provided the route to the source S, with lower values having higher preference. Metric is the unicast routing metric associated with the route to reach S. The priority for selection is the inverse of the selection-metric. That is, the source with the lowest selection-metric has the highest priority for selection.

A channel with channel-state of FAILED must not be selected. When the channel-state of a channel changes from FAILED to OK, the channel becomes a candidate for being selected. The channel will not be selected if another channel has been selected and that channel continues to have channel-state of OK.

If no channel has channel-state of OK, and consequently none are selected, the working SPL, possibly reordered according to the value of selection-priority, is searched in order from highest to lowest selection priority in an attempt to find a channel whose channel-state has changed to OK as a result of ongoing monitoring. All channels may have channel-state of FAILED as a result of initialization, or as a result of later monitoring detecting that all channels have failed. Searching is repeated until a channel with channel-state of OK is found.

When searching the working SPL and no channel with channel-state OK has yet been found, a not-joined channel may be found. This could result if a channel was configured with pre-join="n" or if a channel was previously joined then pruned. In this case, the not-joined channel is joined provided the source is reachable according to the unicast routing information. Subsequently the channel is monitored, and channel-state is set.

The join, prune, and monitor processing that takes place when searching the working SPL also depend on the monitor-scope and pre-join parameters.

When monitor-scope is set to "all", the channels are being monitored continuously and their channel-states are known, so searching is simply a matter of examining the channel-states and selecting the first channel with channel-state of OK. Recall that it is recommended that when monitor-scope is set to "all", then all the channels for that group should have prune-failed="n", since the intent is to continue to monitor the channels, and it is simpler to monitor a channel that remains joined.

When monitor-scope is set to "one", the channels are monitored and their channel-states are checked one at a time. That is, if a channel is not already joined, then it is joined and monitored, and if its channel-state is OK, it is selected. However, if the channel-state is failed, the channel is not selected, it is pruned if it has prune-failed="y", and the search continues in the same manner.

Note that for a particular group, when a channel fails, searching the working SPL may result in the same channel or a different channel being selected.

In all cases, when a selected channel fails the following actions are be performed:

Stop forwarding that channel.
If the source of the channel is reachable and prune-failed="y", then prune the channel.
Set the selected-indicator to not-selected.
Subsequently, when searching, as described above, results in a channel being selected, the following actions are taken:
Start forwarding the channel to the outgoing interface list maintained by PIM-SSM (only toward the requesting systems).
If the channel is not already joined, join it.
If its joined-indicator is not already set, set it to JOINED.
Set its selected-indicator to selected.
If the traffic-state of a non-selected channel changes from OK to FAILED, it is no longer a candidate for selection and the following actions are performed:
If the channel is joined
If its source is reachable
If its prune-failed indicator is "y", prune the channel.
Else set its internal PIM-SSM state to NO INFO.

2. Select-all Rule

Select-all is a rule, according to an example embodiment, which results in the selection of all channels with channel-state of OK for a given group. In this case, the Csel is written as $$Csel(i)=G(i)|select-all[SPL(i)]$$

2.2 Csel Processing

After initialization, monitoring, setting channel-state according to the policies, the channel selection and deselection processes are performed, as described here.

With the select-all rule, pre-join is set to "y" for all channels, and all channels are monitored continuously. Monitoring and setting channel-state are ongoing processes.

A channel with channel-state of FAILED must not be selected. When the channel-state of a channel changes from failed to OK, it is selected.

With S(*), monitoring may result in discovery of one or more non-configured sources for the group. If a discovered source has channel-state of OK, it is added to the working SPL and is selected.

The following actions are performed on a channel as a result of being selected.

The traffic is forwarded out the interfaces in the outgoing interface list maintained by PIM-SSM (only toward the requesting systems).

Set the joined-indicator to JOINED.

Set the selected-indicator to selected.

If the channel-state of a channel changes from OK to FAILED, the following actions are performed:

Stop forwarding the channel.

Set the selected-indicator to not-selected.

If prune-failed="y".

If the source is reachable, prune the channel.

Else set its internal PIM-SSM state to NO INFO.

Bundled Groups

The concept of bundling, according to one example embodiment, is to treat a particular set of groups as a single entity for the purpose of selection and failover. Suppose groups $G(1), G(2), \ldots G(i), \ldots G(imax)$ are to be treated as a bundle, which is identified as $B(1,2,\ldots i,\ldots imax)$, and that the bundle is sourced from locations $[L(1), L(2), \ldots L(j), \ldots L(jmax), L(*)]$. A location does not necessarily refer to a single geographic location. A group may not be configured as part of more than one bundle at a given time. In the following, when referring to bundles, source location is referred to simply as location.

For each location, there is a single source for each group in the bundle. The source for $G(i)$ at location $L(j)$ is $S(i,j)$, and $L(j)$ is written as:

$$\text{For } B(1,2,\ldots i,\ldots imax): L(j)=[S(1,j),S(2,j),\ldots S(i,j),\ldots S(imax,j)]$$

In some cases, all the groups in a bundle may have the same source at a given location. However, this is not assumed here. For brevity, a bundle and a particular location for that bundle is denoted as B-L.

L(*) is, in one example embodiment, optional. It represents one or more locations that may exist for the bundle but which are not explicitly configured. L(*) may be used in cases in which there is no a priori knowledge of all the locations for a bundle, or if it is desired to have a locations discovered and added to the list automatically.

When L(*) is specified, a working location list is maintained. The working location list is initialized to the configured location list, but without the L(*):

$$\text{For bundle } B: \text{initial working location-list}=[L(1), L(2),\ldots L(j),\ldots L(jmax)]$$

With L(*), monitoring may result in discovery of one or more non-configured locations for the bundle. These non-configured locations are added as they are discovered to the working location-list. A discovered location is added to the list only if its bundle-location-state, or B-L-state is OK.

For bundles, the following simplifying assumptions may be made:

Each G(i) in the bundle has a single policy P(i) that applies at all locations, and thereby to all the sources at those locations.

If L(*) is configured, the policies that apply to the groups in a bundle also apply to any discovered B-Ls.

The set of policies for $B(1,2,\ldots i,\ldots imax)$ is denoted by $P(1,2,\ldots i,\ldots imax)$. The set of policies for a bundle is the same for all locations of the bundle.

Select-One Rule

The select rule for a bundle could involve various AND, OR, XOR, and grouping operations, but only the select-one location rule is described here. Also, with the select-one rule for bundles, the following simplifying assumption is made: A monitor-scope parameter, as defined for individual groups, is not extended to apply to bundles. That is, at most one location of a bundle is monitored at a time.

The association of a bundle, its policies, its locations, and select-one rule that may be written as:

$$Bsel=B(1,2,\ldots i,\ldots imax)|P(1,2,\ldots i,\ldots imax)\\|select-one[L(1),L(2),\ldots L(j),\ldots L(jmax),L(*)]$$

This is analogous to the non-bundling select-one channel Csel described previously, when the policy for each group is the same for all sources:

$$Csel(i)=G(i)|P(i)|select-one[S(1),S(2)\ldots S(j)\ldots S(jmax),S(*)]$$

In the following, a bundle and a particular location for that bundle is frequently denoted simply as a B-L.

Coexistence of Bsels and Csels

Bsels and Csels can coexist in certain embodiments; however, a group can not be configured in a Csel and as part of a bundle at the same time.

Bundle Policies and Bundle-States

The policy for a group in a bundle may have both a traffic characteristics component and a source reachability component. When that policy includes a traffic characteristics component, the traffic-state of the channel in the bundle is maintained. Traffic-state OK means that the channel is operating normally, according to the traffic policy, and traffic-state FAILED means that the channel is not operating normally, according to the traffic policy. When the policy includes a source reachability component, source-reachable-state is maintained for that channel in the bundle. Source-reachable-state has values REACHABLE or NOT-REACHABLE. If a policy contains a traffic characteristics component and a source reachability component, then the channel-state is OK only if the traffic-state is OK and the source-reachable-state is REACHABLE, otherwise the channel-state is FAILED.

A bundle and a particular location for that bundle may be denoted as B-L. The B-L selection process described below refers to the B-L-state of a bundle at a particular location.

B-L-state OK is the state in which all the channels in the B-L have channel-state OK. When B-L-state is OK, the B-L is a candidate for being selected. A B-L-state of FAILED represents the state in which one or more of the channels in the B-L are in the failed channel-state, in which case that B-L is not a candidate for being selected.

Bundle Indicators

In addition to B-L-state, the following indicators may be defined for B-Ls.

B-L-Joined-Indicator

B-L-joined-indicator has two possible values. Value JOINED indicates that a join for each channel in the B-L has been sent, and PIM-SSM state is maintained for those channels. Value NOT-JOINED indicates that such join messages have not been for one or more channels in the bundle, or that previous joins may have been sent but were followed by prunes.

B-L-Selected-Indicator

B-L-selected-indicator has two possible values. Value SELECTED indicates that all the channels in the B-L have been selected according to the select rule and policies. Value NOT-SELECTED indicates that the B-L is not currently selected. When a B-L is not selected, none of the channels in the B-L are selected.

General Configuration Options

B-L-Prune-Failed Indicator

When the B-L-state of a joined B-L changes from OK to FAILED, if B-L-prune-failed="y" then each channel in the B-L which is reachable according to the unicast routing information maintained by the router is pruned. If B-L-pruned-failed="n" then none of the channels in the B-L are pruned.

B-L Pre-Join

If B-L-pre-join="y", then at startup, a join for each channel in the B-L which is not already joined is sent for all sources which are reachable according to the unicast routing information maintained by the router, even if no systems have requested those channels. Reachable in this context is determined by the unicast routing information, whether or not source-reachable components are in the policy. If B-L-pre-join="n", then such join messages for this B-L are not sent at startup.

B-L-Monitor-Non-Joined

B-L-monitor-non-joined is an indicator associated with a B-L within a Bsel policy. If B-L-monitor-non-joined="n", then a B-L is monitored only if the B-L is joined. If B-L-monitor-non-joined="y", then a B-L is monitored even if the B-L is not-joined.

Bundle-Selection-Priority

A bundle level policy configuration option, Bundle-selection-priority, determines the priority for selection of a location by the select-one rule. When Bundle-selection-priority=explicit, the order of the locations as they appear in the working location list determines the priority for selection, with the leftmost, L(1), being the highest priority. When selection-priority=dynamic, the selection priority is determined by the location-selection-metric associated with each of the locations in the working location list. Location-selection-metric is composed of the sum of the source selection-metric values over all the sources at that location. Selection-metric for an individual source is composed of metric-preference, metric, and S, as described above. The priority for location selection is the inverse of the location-selection-metric. That is, the location with the lowest location-selection-metric has the highest priority for selection.

Bundle Processing

The concept of bundling is to treat a particular set of groups as a single entity for the purpose of selection and failover. Therefore, with the definitions and simplifying assumptions noted above for bundles, the processing of bundles is analogous to Csel processing as described in above, but with bundles replacing groups, B-Ls replacing channels, and bundle-specific indicators and configuration options replacing channel-specific counterparts.

IGMP and PIM Interworking Considerations

In the case of the select-one rule, operation of the DSS module 40 may result in a channel c1 being selected and channel c2 being pruned, as a result of configuring the prune-failed indicator to "y". Subsequently, an IGMPv3 Include for c2 or a PIM-SSM join for c2 may be received. The action taken in this situation may be controlled by a group level policy configuration option, DSS-override. When DSS-override-join is on for group G, and a channel c1 for G has been selected, an IGMPv3 Include or PIM-SSM join for any channel for G other than c1 is silently discarded, and a message of the action is sent to the management system.

If a channel has a currently active IGMPv3 Include (in the IGMPv3 state maintained by the router, the source timer for the source of the channel has not expired), the behavior of the router, absent the DSS module 40, is to forward the traffic of the channel. However, when the DSS module 40 is present and operational, a DSS initiated prune will cause the channel to be pruned and traffic for that channel will no longer be forwarded, even if there is an active IGMPv3 Include.

Management System Messages

DSS sends messages to the management system to inform it of various state changes. For example, the following actions result in sending of such messages:

When a channel fails, in order to identify the channel and the cause of the failure (traffic-state or source-reachable information).

When a channel is selected or deselected. The message should identify the channel.

Figure 7:
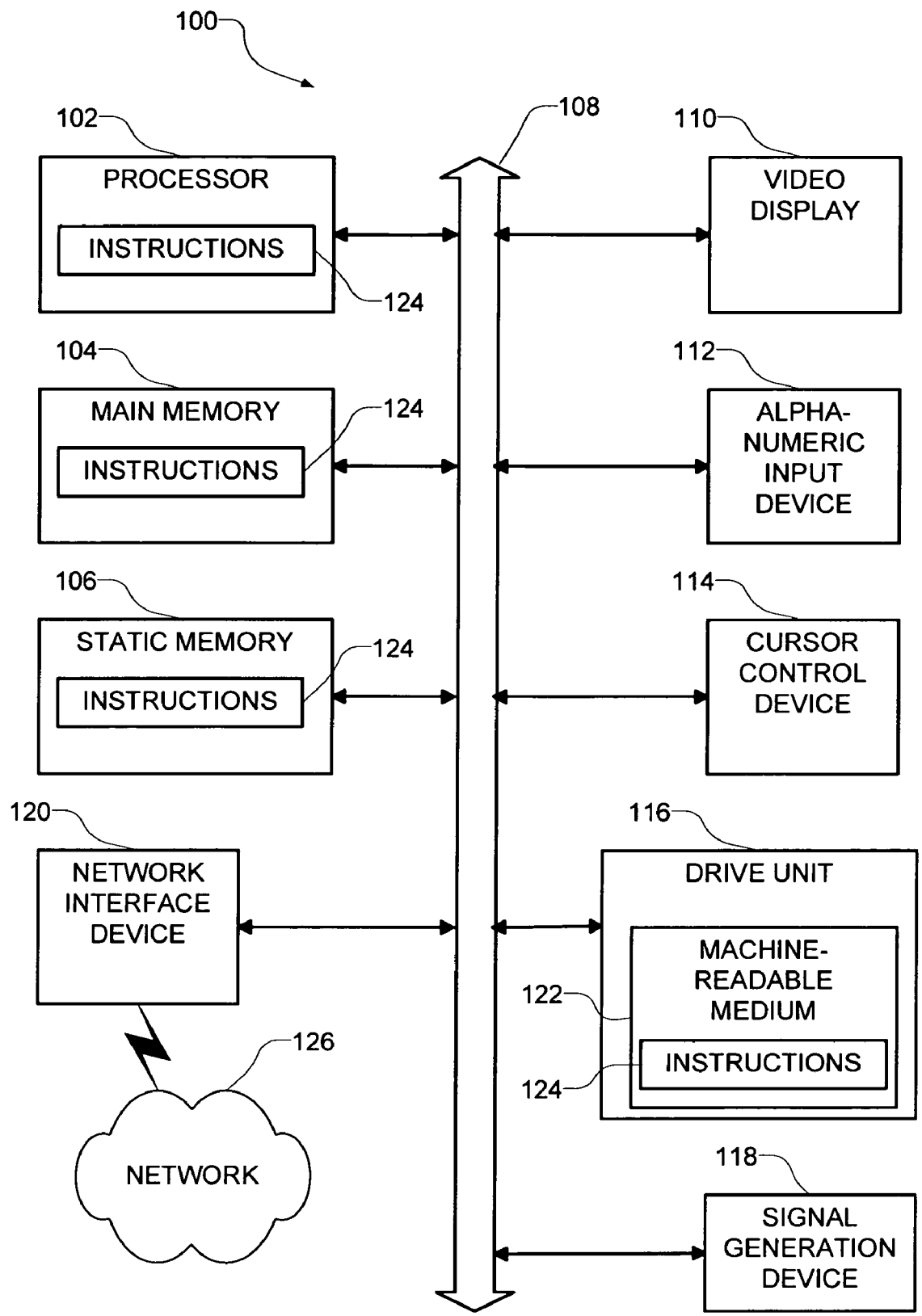
FIG. 7 shows a diagrammatic representation of machine in the example form of a computer system within which a set of instructions, for causing the machine to perform any one or more of the methodologies discussed herein, may be executed.

FIG. 7 shows a diagrammatic representation of machine in the example form of a computer system 100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU) a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions (e.g., software 124) embodying any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120.

While the machine-readable medium 122 is shown in an example embodiment to be a single medium, the term "machine-readable medium" should be taken to include a single medium or multiple media (e.g., a centralized database; and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

What is claimed is:

1. A method to perform a dynamic source selection within an IP multicast network, the method comprising:
   at a router in the IP multicast network, selecting a first primary source of a multicast group to be forwarded to a receiving host;
   detecting that the first primary source exhibits a predetermined characteristic which causes one of the first primary source or a multicast stream originating from the first primary source to fail, wherein the failure is detected based on channel data and policy data, wherein the channel data and the policy data comprise a list of alternate sources of the multicast group and associated policies configured for the multicast group, and wherein the policy data includes at least one traffic characteristic and reachability associated with the first primary source; and
   at the router, responsive to the detection that the first primary source exhibits the predetermined characteristic, selecting a second backup source of the multicast group to be forwarded to the receiving host according to at least one of an active traffic state, a reduced traffic state, a corrupted traffic state, and an absent traffic state that is determined for each of the alternate sources,
   wherein the automatic selection of the second backup source of the multicast group is performed with reference to a rule, and
   wherein the rule is one of a group of rules including a select-one rule to select a single source from the plurality of sources of the multicast group, a select-all rule to select all operational sources from the plurality of sources, and a complex rule according to a logical expression.

2. The method of claim 1, wherein the reachability is determined from unicast routing information, and wherein the at least one traffic characteristic comprises at least one of bandwidth, sample frequency, one or more sample duration parameters, or one or more parameters corresponding to one or more traffic states.

3. The method of claim of 1, wherein the detecting that the first primary source exhibits the predetermined characteristic includes monitoring reachability of the first primary source, as determinable from routing information pertaining to the first primary source.

4. The method of claim 1, wherein the predetermined characteristic is specified by a policy associated with the first primary source, the policy further specifying at least one value for the predetermined characteristic.

5. The method of claim 4, wherein the at least one value is associated with at least one of a number of states of the first primary source.

6. The method of claim 4, wherein the policy specifies a plurality of indicators to control monitoring of the first primary source and the selection of the second backup source.

7. The method of claim 1, wherein the first primary source and the second backup sources of the multicast group are associated with respective first and second channels, each of the first and second channels being defined in terms of a respective multicast source and the multicast channel.

8. A non-transitory computer readable medium storing a set of instructions that, when executed by a machine, cause the machine to:
   select a first primary source of a multicast group to be forwarded to a receiving host;
   detect that the first primary source exhibits a predetermined characteristic which causes one of the first primary source or a multicast stream originating from the first primary source to fail, wherein the failure is detected based on channel data and policy data, wherein the channel data and the policy data comprise a list of alternate sources of the multicast group and associated policies configured for the multicast group, and wherein the policy data includes at least one traffic characteristic and reachability associated with the first primary source; and
   responsive to the detection that the first primary source exhibits the predetermined characteristic, select a second backup source of the multicast group to be forwarded to the receiving host according to at least one of an active traffic state, a reduced traffic state, a corrupted traffic state, and an absent traffic state that is determined for each of the alternate sources,
   wherein the automatic selection of the second backup source of the multicast group is performed with reference to a rule, and
   wherein the rule is one of a group of rules including a select-one rule to select a single source from the plurality of sources of the multicast group, a select-all rule to select all operational sources from the plurality of sources, and a complex rule according to a logical expression.

9. The non-transitory computer readable medium of claim 8, wherein the reachability is determined from unicast routing information, and wherein the at least one traffic characteristic comprises at least one of bandwidth, sample frequency, one or more sample duration parameters, or one or more parameters corresponding to one or more traffic states.

10. The non-transitory computer readable medium of claim 8, wherein the detecting that the first primary source exhibits the predetermined characteristic includes monitoring reachability of the first primary source, as determinable from routing information pertaining to the first primary source.

11. The non-transitory computer readable medium of claim 8, wherein the predetermined characteristic is specified by a policy associated with the first primary source, the policy further specifying at least one value for the predetermined characteristic.

12. The non-transitory computer readable medium of claim 11, wherein the at least one value is associated with at least one of a number of states of the first primary source.

13. The non-transitory computer readable medium of claim 11, wherein the policy specifies a plurality of indicators to control monitoring of the first primary source and the selection of the second backup source.

14. The non-transitory computer readable medium of claim 8, wherein the first primary source and the second backup sources of the multicast group are associated with respective first and second channels, each of the first and second channels being defined in terms of a respective multicast source and the multicast channel.

* * * * *